(12) United States Patent
Ha (10) Patent No.: US 9,596,576 B2
(45) Date of Patent: Mar. 14, 2017

(54) PROVIDING SERVICES ACCORDING TO SUBSCRIPTION STATUS OF USER EQUIPMENT

(75) Inventor: Kwang-Jun Ha, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 593 days.

(21) Appl. No.: 13/453,036

(22) Filed: Apr. 23, 2012

(65) Prior Publication Data

US 2012/0269141 A1 Oct. 25, 2012

(30) Foreign Application Priority Data

Apr. 22, 2011 (KR) .................. 10-2011-0038039

(51) Int. Cl.
| | | |
|---|---|---|
| *H04W 4/00* | (2009.01) | |
| *H04W 4/08* | (2009.01) | |
| *H04W 84/04* | (2009.01) | |
| *H04W 76/00* | (2009.01) | |
| *H04L 29/06* | (2006.01) | |
| *H04W 12/08* | (2009.01) | |

(52) U.S. Cl.
CPC ............ *H04W 4/08* (2013.01); *H04W 84/045* (2013.01); *H04L 63/02* (2013.01); *H04W 12/08* (2013.01); *H04W 76/002* (2013.01)

(58) Field of Classification Search
USPC ........................................................ 370/329
See application file for complete search history.

(56) References Cited

U.S. PATENT DOCUMENTS

| | | | |
|---|---|---|---|
| 2009/0098858 A1 | 4/2009 | Gogic | |
| 2010/0112980 A1* | 5/2010 | Horn | H04W 48/20 455/411 |
| 2010/0130212 A1 | 5/2010 | So et al. | |
| 2010/0265827 A1 | 10/2010 | Horn et al. | |
| 2011/0069659 A1* | 3/2011 | Kong | H04W 48/06 370/328 |
| 2011/0312324 A1 | 12/2011 | Jin et al. | |

FOREIGN PATENT DOCUMENTS

| | | |
|---|---|---|
| JP | 2007-129405 A | 5/2007 |
| JP | 2008-270919 A | 11/2008 |
| KR | 10-2004-0028090 A | 4/2004 |
| KR | 10-0883268 B1 | 2/2009 |
| KR | 10-2009-0103410 A | 10/2009 |
| KR | 10-2010-0098339 A | 9/2010 |

(Continued)

*Primary Examiner* — Yemane Mesfin
*Assistant Examiner* — Jeff Banthrongsack
(74) *Attorney, Agent, or Firm* — IP Legal Services, LLC (57) ABSTRACT

Provided are a femtocell base station and a method for providing different levels of service according to a user's subscription. The femtocell base station may include a determination unit and an IP request unit. The determination unit may be configured to determine whether user equipment coupled to the femtocell base station is a closed subscriber group (CSG) member or a non-CSG member based on subscription information of the user equipment. The IP request unit may be configured to allocate a private IP address to user equipment determined as the CSG-member and to allocate a public IP address to user equipment determined as the non-CSG member.

19 Claims, 3 Drawing Sheets

(56) References Cited

FOREIGN PATENT DOCUMENTS

| KR | 10-2011-0031097 A | 3/2011 | |
|----|-------------------|--------|---|
| WO | 2010/048583 A2 | 4/2010 | |
| WO | 2010/121198 A1 | 10/2010 | |
| WO | 2010/121635 A1 | 10/2010 | |
| WO | WO2010121198 A1 * | 10/2010 | |

* cited by examiner

PROVIDING SERVICES ACCORDING TO SUBSCRIPTION STATUS OF USER EQUIPMENT

CROSS REFERENCE TO PRIOR APPLICATIONS

The present application claims priority under 35 U.S.C. §119 to Korean Patent Application No. 10-2011-0038039 (filed on Apr. 22, 2011), which is hereby incorporated by reference in its entirety.

FIELD OF THE INVENTION

The present invention relates to communications and, in particular, to providing different levels of service according to a user's subscription.

BACKGROUND OF THE INVENTION

A femtocell base station is designed to connect user equipment located in a femtocell to a service provider's network. A femtocell may denote a small service area covered by a femtocell base station. For example, the femtocell may be a home or a small business office in a cellular system. The range of a femtocell base station may be about 10 meters. The femtocell base station has been applied to a Long Term Evolution (LTE) communication network. The $3^{rd}$ Generation Partnership Project (3GPP) has introduced standard specifications for LTE technology. In 3GPP LTE standard specifications, the femtocell base station as well as a macrocell base station is defined. The femtocell base station may be referred to as a Home NodeB (HNB) for a 3G femtocell or as a Home Evolved Node Base station (HeNB) for an LTE femtocell. The macrocell base station may be referred to as an evolved NodeB (eNB).

The 3GPP LTE standard specifications define three access control modes of a femtocell base station. The access control mode may enable a femtocell base station to control access of user equipment. The access control mode may include an open access mode, a closed subscriber group (CSG) access mode, and a hybrid access mode. An open mode femtocell base station, operated in the open access mode, unconditionally allows user equipment to access and to use resources thereof. A CSG mode femtocell base station, operated in a CSG access mode, allows user equipment belonging to a related CSG to access and to use resources thereof. The CSG may be a group of user equipment that is allowed to access to one specific femtocell or a group of femtocells. A hybrid mode femtocell base station, operated in a hybrid access mode, first allows access of user equipment belonging to a related CSG. Such user equipment may be referred to as CSG-member user equipment. If the hybrid mode femtocell base station has available resources after allowing the CSG-member user equipment, the hybrid mode femtocell base station allows user equipment not belonging to the related CSG. Such user equipment may be referred to as non-CSG member user equipment.

As described above, a femtocell base station, operated in a CSG access mode or a hybrid access mode, may restrict non-CSG member user equipment from accessing the femtocell base station. The access control mode simply restricts user equipment from accessing a corresponding femtocell base station. Such a restriction policy generally creates inconvenience for many users. For example, non-CSG member user equipment, such as a visitor's user equipment, generally desires access to a public Internet network through a femtocell base station operated in a CSG access mode or a hybrid access mode. In this case, non-CSG member user equipment cannot access the public Internet network because it is restricted from accessing the femtocell base station.

SUMMARY OF THE INVENTION

This summary is provided to introduce a selection of concepts in a simplified form that are further described below in the detailed description with reference to the drawings. This summary is not intended to identify key features or essential features of the claimed subject matter, nor is it intended to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, different levels of services may be provided according to a subscription status of user equipments.

In accordance with another aspect of the present invention, a femtocell base station employing an access control mode may provide an Intranet service to CSG-member user equipment and provide an Internet service to non-CSG member user equipment.

In accordance with an embodiment of the present invention, a method may be provided for providing different levels of service by a femtocell base station according to a subscription status of user equipment. The method may include determining whether the user equipment coupled to the femtocell base station is a closed subscriber group (CSG) member or a non-CSG member based on subscription information of the user equipment, and allocating a first IP address to user equipment determined as the CSG-member and allocating a second IP address to user equipment determined as the non-CSG member.

The determining may include collecting the subscription information of the user equipment from at least one of a subscriber server and the user equipment.

The collecting may include requesting the subscriber server to transmit the subscription information of the user equipment, and receiving the requested subscription information from the subscriber server.

The collecting may include requesting the user equipment to transmit the subscription information stored in the user equipment, and receiving the requested subscription information from the user equipment.

The subscription information may be in a universal subscriber identity module (USIM) card of the user equipment.

The determining may include extracting the subscription information from one or more messages exchanged with at least one of the user equipment and a packet data network gateway.

The message may include a user equipment (UE) REGISTER REQUEST message in a registration procedure and a non-access-stratum (NAS) REQUEST message in a NAS procedure.

The determining may include extracting an allowed CSG list from the subscription information of the user equipment, determining the user equipment as the CSG member when the allowed CSG list includes a CSG identity of the femtocell base station, and determining the user equipment as the non-CSG member when the allowed CSG list does not include the CSG identity of the femtocell base station.

The allocating may include requesting allocation of the first IP address by a packet data network gateway to the user equipment determined as the CSG member, receiving the requested first IP address from the packet data network gateway, and assigning the first IP address to the user equipment determined as the CSG member.

The method may further include receiving packets from the user equipment determined as the CSG member and forwarding the received packets to a first network associated with the first IP address, and receiving packets from the first network and forwarding the received packets to the user equipment determined as the CSG member.

The allocating may include requesting allocation of the second IP address by a packet data network gateway to the user equipment determined as the non-CSG member, receiving the requested second IP address from the packet data network gateway, and assigning the second IP address to the user equipment determined as the non-CSG member.

The method may further include receiving packets from the user equipment determined as the non-CSG member and forwarding the received packets to a second network associated with the second IP address, and receiving packets from the second network and forwarding the received packets to the user equipment determined as the non-CSG member.

For the allocating, the first IP address may be a private IP address and the first network is an Intranet network, and the second IP address may be a public IP address and the second network is an Internet network.

The method may include employing, by the femtocell base station, an access control mode. Particularly, the method may include operating the femtocell base station in one of a CSG access mode and a hybrid mode.

In accordance with another embodiment of the present invention, a femtocell base station may include a determination unit and an IP request unit. The determination unit may be configured to determine whether user equipment coupled to the femtocell base station is a closed subscriber group (CSG) member or a non-CSG member based on subscription information of the user equipment. The IP request unit may be configured to allocate a private IP address to user equipment determined as the CSG-member and to allocate a public IP address to user equipment determined as the non-CSG member.

The femtocell base station may include a packet routing unit. The packet routing unit may be configured to route packets having the private IP address between the user equipment determined as the CSG member and an Intranet network associated with the private address, and to route packets having the public IP address between the user equipment determined as the non-CSG member and an Internet network associated with the public IP address.

The determination unit is configured to collect the subscription information of the user equipment from at least one of a subscriber server and the user equipment, to extract an allowed CSG list from the subscription information of the user equipment, to determine the user equipment as the CSG member when the allowed CSG list includes a CSG identity of the femtocell base station, and to determine the user equipment as the non-CSG member when the allowed CSG list does not include the CSG identity of the femtocell base station.

The IP request unit may be configured to request a packet data network gateway to allocate the private IP address to the user equipment determined as the CSG member and to allocate the public IP address to the user equipment determined as the non-CSG member, to receive one of the private IP address and the public IP address from the packet data network gateway, to assign the user equipment determined as the CSG member with the private IP address, and to assign the user equipment determined as the non-CSG member with the public IP address.

The femtocell base station may operate in one of a CSG access mode and a hybrid mode.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF IRE INVENTION

Reference will now be made in detail to embodiments of the present invention, examples of which are illustrated in the accompanying drawings, wherein like reference numerals refer to like elements throughout. The embodiments are described below, in order to explain the present invention by referring to the figures.

Embodiments of the present invention will be described representatively as being employed in a long term evolution (LTE) network, The present invention, however, is not limited thereto. Embodiments of the present invention will be similarly applied to other types of communication networks, for examples, global system for mobile communication (GSM), code division multiple access (CDMA) 2000, time division synchronous code division multiple access (TD-SCDMA), worldwide interoperability for microwave access (WiMAX), and wireless broadband (WiBro). Furthermore, embodiments of the present invention will be described representatively as being employed in a femtocell base station. However, the present invention is not limited thereto. Embodiments of the present invention will be similarly applied to other base stations such as macrocell base station.

In accordance with an embodiment of the present invention, different levels of various services may be provided to various user equipment according to a subscription status of thereof. Particularly, a femtocell base station, operation in a CSG access mode or operation in a hybrid access mode, may provide an Intranet service to CSG-member user equipment and provide an Internet service to non-CSG member user equipment in accordance with an embodiment of the present invention. Hereinafter, a system and method for providing different levels of services to user equipments according to a subscription status thereof in accordance with an embodiment of the present invention will be described with reference to FIG. 1 to FIG. 4.

Figure 1:
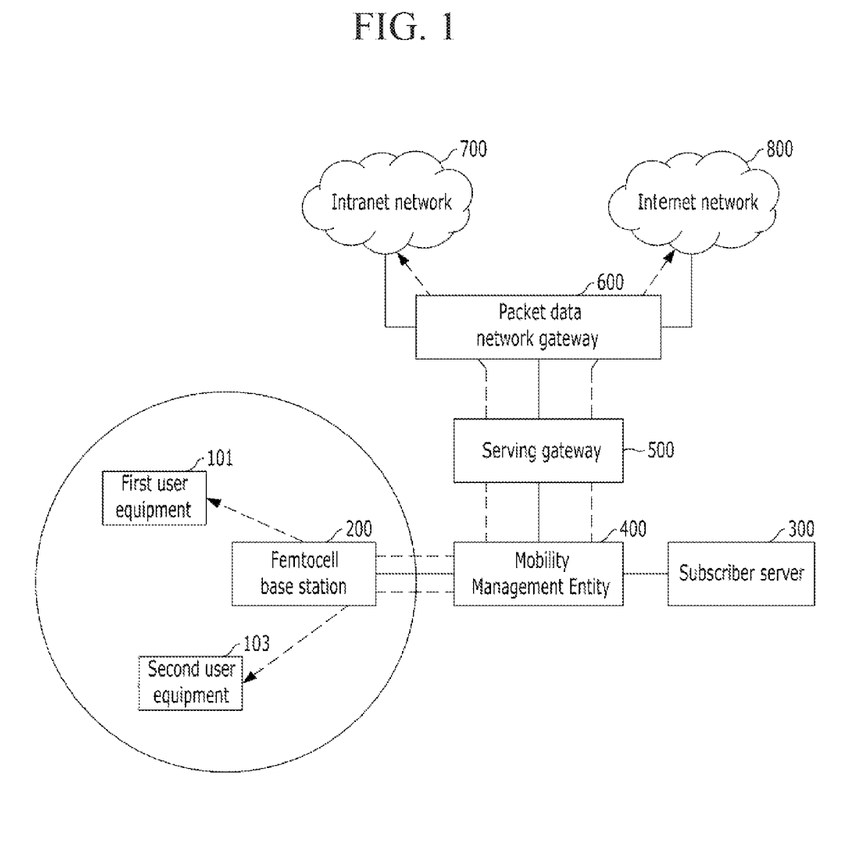
FIG. 1 shows a LTE network employing an embodiment of the present invention.

FIG. 1 shows a LTE network employing an embodiment of the present invention.

Referring to FIG. 1, an LTE network may include first and second user equipment 101 and 103, femtocell base station 200, subscriber server 300, mobility management entity 400, serving gateway 500 and packet data network gateway 600.

First and second user equipments 101 and 103 may access femtocell base station 200 and be provided with different level of femtocell services according to a subscription status thereof. For example, first user equipment 101 may be CSG member user equipment belonging to the same closed subscriber group (CSG) of femtocell base station 200. Second user equipment 103 may be non-CSG member user equipment not belonging to the same CSG of femtocell base station 200. First and second user equipment 101 and 103 may have subscription information that indicates a subscription status thereof. Such subscription information may be an allowed CSG list. The allowed CSG list may include CSG identities of femtocell base stations that user equipment subscribes thereto. Based on the subscription information, user equipment may be determined as CSG member user equipment and non-CSG member user equipment.

In accordance with an embodiment of the present invention, CSG member user equipment 101 may access Intranet network 700 through femtocell base station 200 operated in a CSG access mode or a hybrid access mode. Furthermore, non-CSG member user equipment 103 may access Internet network 800 through femtocell base station 200 operated in a CSG access mode or a hybrid access mode.

Femtocell base station 200 may be coupled with first user equipment 101 and second user equipment 103 and employ an access control mode. For example, femtocell base station 200 may be operated in a CSG access mode or a hybrid access mode. Femtocell base station 200 may provide different levels of services to first and second user equipment 101 and 103 according to the subscription status thereof. Particularly, femtocell base station 200 may provide an Intranet service to CSF-member user equipment and provide an Internet service to non-CSG member user equipment in accordance with an embodiment of the present invention.

In order to provide such different levels of service, femtocell base station 200 may determine whether first and second user equipment 101 and 103 is CSG-member user equipment or non-CSG member user equipment based on subscription information thereof. Femtocell base station 200 may collect the subscription information from first and second user equipments 101 and 103 and/or from subscriber server 300. The subscription information may be an allowed CSG list, but the present invention is not limited thereto. The subscription information may be a CSG white list or an allowed international mobile subscriber identity (IMSI) list.

Femtocell base station 200 may request packet data network gateway 600 to allocate one of a public IP address and a private IP address. For example, femtocell base station 200 may request packet data network gateway 600 to allocate a public IP address for non-CSG member user equipment 103 and to allocate a private IP address for CSG-member user equipment 101. That is, femtocell base station 200 may enable CSG-member user equipment 101 to access Intranet network 700 and enable non-CSG member user equipment 103 to access Internet network 800.

Femtocell base station 200 may rot e packets from CSG-member user equipment 101 to Intranet network 700 and route packets from non-CSG member user equipment 103 to Internet network 800. Accordingly, user equipment 103 may connect to the Internet service although user equipment 103 does not belong, to the same CSG of femtocell base station 200.

Subscriber server 300 may store and manage identification information and subscription information of user equipments 101 and 103. For example, subscriber server 300 may store a CSG white list, an allowed IMSI list, a CSG identity of femtocell base station 200, and IMSIs of user equipment 101 and 103.

MME 400 may connect femtocell base station 200 to a core network. MME 400 may also control handover between femtocell base stations, and manage mobile routes of user equipment 101 and 103. MME 400 may also control signals exchanged between femtocell base station 200 and serving gateway 500. MME 400 may receive an allowed CSG list of user equipment 101 or 103 from subscriber server 300 when user equipment 100 is registered and transmit the CSG list to femtocell base station 200.

Serving gateway 500 may perform an anchoring function, a packet routing function, and a packet forwarding function between related networks such as between macrocell base stations and femtocell base stations.

Packet data network gateway 600 may manage movement of user equipment between LTE and non-3GPP network. Packet data network gateway 600 may also perform IP allocation, deliver account information, and perform packet filtering. Packet data network gateway 600 may be coupled to both of Intranet network 700 and Internet network 800 and located on a packet data transmission path.

In accordance with an embodiment of the present invention, packet data network gateway 600 may receive an IP allocation request from femtocell base station 200 and provide one of a private IP address and a public IP address to femtocell base station 200 in response to the IP allocation request.

Figure 2:
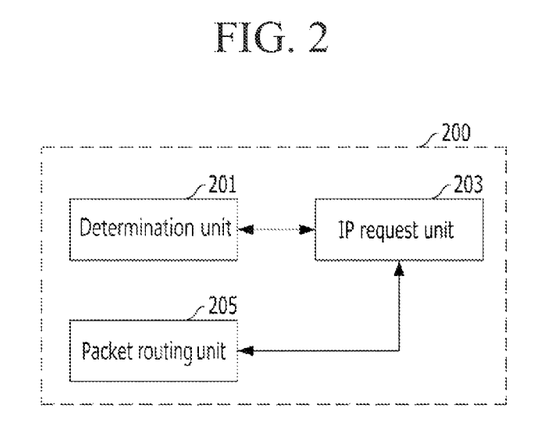
FIG. 2 shows a femtocell base station in accordance with an embodiment of the present invention.

Hereinafter, femtocell base station 200 will be described in detail with reference to FIG. 2. FIG. 2 shows a femtocell base station in accordance with an embodiment of the present invention.

Referring to FIG. 2, femtocell base station 200 may include determination unit 201, IP request unit 203, and packet routing unit 205. Femtocell base station 200 may employ an access control mode. For example, femtocell base station 200 may be operated in a CSG access mode or a hybrid access mode. For convenience and ease of understanding, femtocell base station 200 will be described as being coupled to user equipment 101 and 103, although any number of user equipment might be coupled to femtocell base station 200. Furthermore, user equipment 101 includes a CSG identity of femtocell base station 200 in its allowed CSG list and user equipment 103 does not include CSG identity of femtocell base station 200 in its allowed CSG list.

Determination unit 201 may determine whether coupled user equipment 101 or 103 is CSG member user equipment or non-CSG member user equipment based on a subscription status thereof. Determination unit 201 may collect subscription information of user equipment 101 and 103. In order to collect the subscription information, determination unit 201 may request such subscription information from subscriber server 500 or user equipment 101 and 103. In response to the request, determination unit 201 may receive the subscription information from subscriber server 300 or from user equipment 101 and 103. The subscription information may include an allowed CSG list of user equipment 101 and 103. For example, since the allowed CSG list of user equipment 101 includes a CSG identity of femtocell base station 200, determination unit 201 may determine user equipment 101 as CSG-member user equipment. Furthermore, since the allowed CSG list of user equipment 103 does not include a CSG identity of femtocell base station 200, determination unit 201 may determine user equipment 103 as non-CSG member user equipment. The present invention, however, is not limited thereto. The subscription information may include IMSIs and allowed MST lists of user equipments 101 and 103. Determination unit 201 may use IMSIs and allowed IMSI lists to determine user equipment 101 and 103 as CSG-member user equipment or non-CSG member user equipment, respectively. Furthermore, the subscription information may be collected from messages exchanged between femtocell base station 200 and user equipment 101 and 103 and/or between fetntocelt base station 200 and packet data network gateway 600. For example, the subscription information may be collected from a user equipment (UE) REGISTER REQUEST message in a registration procedure and a non-access-stratum (NAS) REQUEST message in a NAS procedure. The present invention, however, is not limited thereto. Other message may be used to transmit such user equipment identification data. In addition, the subscription information may be stored in a universal subscriber identity module (USIM) card equipped in user equipments 101 and 103.

Determination unit 201 was described as determining whether coupled user equipment as CSG-member user equipment or non-CSG member user equipment. The present invention, however, is not limited thereto. In accordance another embodiment of the present invention, femtocell base station 200 may transmit the collected subscription information to packet data network gateway 600 and packet data network gateway 600 may determine the subscription status of user equipments 101 and 103 based on the received subscription information and determine whether user equipment 101 and 103 are CSG-member user equipment or non-CSG member use equipment.

IP request unit 203 may transmit the determined subscription status of user equipments 101 and 103 and an IP allocation request to packet data network gateway 600. Furthermore, IP request unit 203 may receive one of a private IP address and a public IP address from packet data network gateway 600. Based on the received IP address, IP request unit 203 may assign the received IP address to corresponding user equipment 101 and 103. For example, IP request unit 203 may request a private IP address for CSG-member user equipment 101 to packet data network gateway 600 and receive the requested private IP address from packet data network gateway 600. IP request unit 203 may assign the private IP address to CSG-member user equipment 101 in order to enable user equipment 101 to access Intranet network 700. Furthermore, IP request unit 203 may request a public IP address for non-CSG member user equipment 103 to packet data network gateway 600 and receive the request public IP address from packet data network gateway 600. IP request unit 203 may assign the public IP address to non-CSG member user equipment 103 in order to enable user equipment 103 to access Internet network 800.

Packet routing unit 205 may receive packets from one of user equipment 101 and 103 and transmit packets in one of Intranet network 700 and Internet network 800 through packet data network gateway 600 according to the IP address included in the received packet. Packet routing unit 205 may receive packets from one of Intranet network 700 and Internet network 800 through packet data network gateway 600 and transmit packets to one of user equipment 101 and 103. For example, packet routing unit 205 may receive packets from CSG-member user equipment 101 and transmit the packets to the Intranet network 700 through packet data network gateway 600. Packet routing unit 205 may receive packets from Intranet network 700 through packet data network gateway 600 and transmit the packets to CSG-member user equipment 101. Furthermore, packet routing unit 205 may receive packets from non-CSG member user equipment 103 and route the packets to the Internet network 800 through packet data network gateway 600. Packet routing unit 205 may receive packets from Internet network 800 through packet data network gateway 600 and transmit the packets to non-CSG member user equipment 103.

Figure 3:
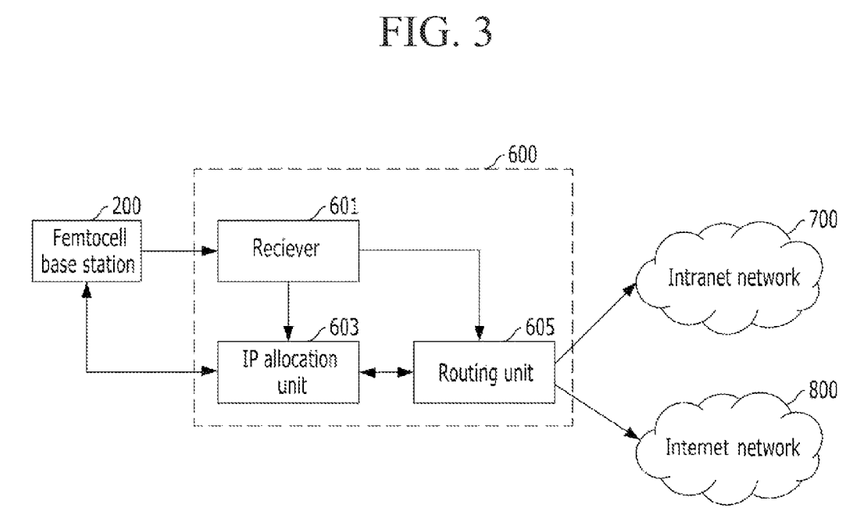
FIG. 3 illustrates a packet data network gateway in accordance with an embodiment of the present invention.

FIG. 3 illustrates a packet data network gateway in accordance with an embodiment of the present invention.

Referring to FIG. 3, packet data network gateway 600 may include receiver 601, IP allocation unit 603, and routing unit 605.

Receiver 601 may receive an IP allocation request from femtocell bas station 200 with the subscription status of user equipment 101 and 103 from femtocell base station 200. Receiver 601 may transmit the received IP allocation request to IP allocation unit 603. The present invention, however, is not limited thereto. In accordance with another embodiment of the present invention, receiver 601 may receive the collected subscription information of user equipment 101 and 103 from femtocell base station 200. Packet data network gateway 600 may determine the subscription status of user equipment 101 and 103 based on the received subscription information and determine whether user equipments 101 and 103 are CSG-member user equipment or non-CSG member use equipment.

IP allocation unit 603 may allocate different type of IP addresses to user equipments 101 and 103 based on the IP allocation request from femtocell base station 200 and/or the subscription status of user equipment 101 and 103. For example, IP allocation unit 603 may allocate a private IP address to CSG-member user equipment 101 and allocate a public IP address to non-CSG member user equipment 103. IP allocation unit 604 may transmit the allocated IP address to femtocell base station 200.

Routing unit 605 may connect one of Intranet network 700 and Internet network 800 to user equipment 101 and 103 based on the allocated IP type of user equipments 101 and 103. For example, routing unit 605 might receive packets from femtocell base station 200 and transmit the packets to one of Intranet network 700 and Internet network 800 according to the IP address included in the received packet. Packet routing unit 205 may receive packets from one of Intranet network 700 and Internet network 800 and transmit the packets to one of user equipment 101 and 103 through femtocell base station 200.

Figure 4:
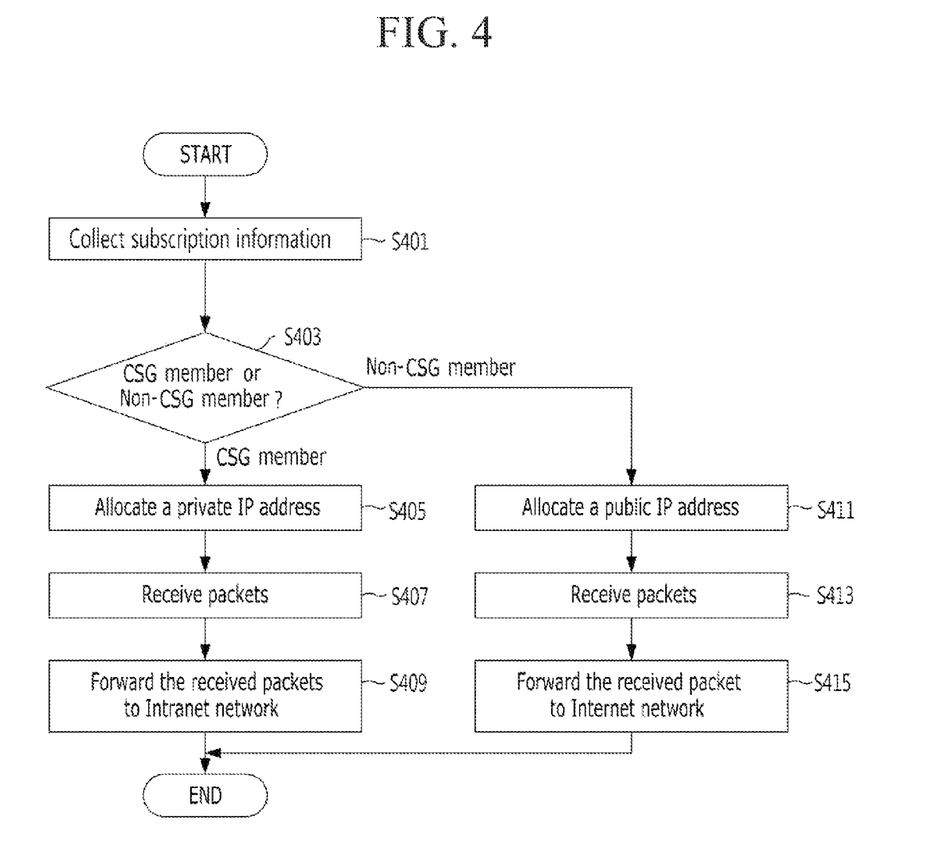
FIG. 4 shows a method for providing different levels of services to user equipment according to a subscription status thereof in accordance with an embodiment of the present invention.

FIG. 4 shows a method for providing different levels of services to user equipment according to a subscription status thereof in accordance with an embodiment of the present invention.

Referring to FIG. 4, subscription information may be collected at step S401. For example, the subscription information may be collected by femtocell base station 200. The femtocell base station 200 may request such subscription information to subscriber server 500 or user equipment 101 and 103. In response to the request, femtocell base station 200 may receive the subscription information from subscriber server 300 or user equipment 101 and 103. The subscription information may include an allowed CSG list of user equipment 101 and 103. Furthermore, the subscription information may be collected from messages exchanged between femtocell base station 200 and user equipments 101 and 103 and/or between timitocell base station 200 and packet data network gateway 600. For example, the subscription information may be collected from a user equipment (UE) REGISTER REQUEST message in a registration procedure and a non-access-stratum (NAS) REQUEST message in a NAS procedure. The subscription information may be stored in a universal subscriber identity module (USIM) card equipped in user equipment 101 and 103. The present invention, however, is not limited thereto.

At step S403, determination may be made whether user equipment is CSG-member or non-CSG member based on the collected subscription information. For example, femtocell base station 200 may extract allowed CSG lists of user equipment 101 and 103, which are included in the collected subscription information of user equipments 101 and 103. When the allowed CSG list includes a CSG identity of femtocell base station 200, femtocell base station 200 may determine that corresponding user equipment as CSG-member user equipment. Otherwise, femtocell base station 200 may determine that corresponding user equipment as non-CSG member user equipment. For example, since the allowed CSG list of user equipment 101 includes a CSG identity of femtocell base station 200, femtocell base station 200 may determine user equipment 101 as CSG-member user equipment. Since the allowed CSG list of user equipment 103 does not include a CSG identity of femtocell base station 200, femtocell base station 200 may determine user equipment 103 as non-CSG member user equipment. The present invention, however, is not limited thereto. The subscription information may include IMSIs and allowed IMSI lists of user equipment 101 and 103. Femtocell base station 200 may use IMSIs and allowed IMSI lists to determine user equipment 101 and 103 as CSG-member user equipment or non-CSG member user equipment.

When user equipment is determined as the CSG-member user equipment (CSG member—S403), a private IP address may be allocated at step S405. For example, femtocell base station 200 may request packet data network gateway 600 to allocate a private IP address to CSG-member user equipment 101. In response to the request, femtocell base station 200 may receive the allocated private IP address and assign the allocated private IP address to CSG-member user equipment 101. Accordingly, user equipment 101 may access the Intranet network 700 using the private IP address.

After allocation, packets with the private IP address may be received at step S407. In this case, the received packets may be forwarded to Intranet network 700 at step S409.

When user equipment is determined as the non-CSG member user equipment (non-CSG member—S403), a public IP address may be allocated at step S411. For example, femtocell base station 200 may request packet data network gateway 600 to allocate a public IP address to non-CSG member user equipment 103. In response to the request, femtocell base station 200 may receive the allocated public IP address and assign the allocated public IP address to non-CSG member user equipment 103. Accordingly, user equipment 103 may access the Internet network 800 using the public IP address.

After allocation, packets with the public IP address may be received at step S413. In this case, the received packets may be forwarded to Internet network 800 at step S415.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for providing different levels of service by a femtocell base station according to a subscription status of user equipment, the method comprising:
    determining whether the user equipment coupled to the femtocell base station is a closed subscriber group (CSG) member or a non-CSG member based on subscription information of the user equipment; and
    if the user equipment is determined to be a CSG member:
        allocating a private IP address associated with an intranet service of the femtocell base station to the user equipment determined as the CSG-member;
    otherwise, if the user equipment is determined to be a non-CSG member:
        allocating a public IP address associated with an internet service of the femtocell base station to the user equipment determined as the non-CSG member.

2. The method of claim 1, wherein the determining includes:
    collecting the subscription information of the user equipment from at least one of a subscriber server and the user equipment.

3. The method of claim 2, wherein the collecting includes:
    requesting the subscriber server to transmit the subscription information of the user equipment; and
    receiving the requested subscription information from the subscriber server.

4. The method of claim 2, wherein the collecting includes:
    requesting the user equipment to transmit the subscription information stored in the user equipment; and
    receiving the requested subscription information from the user equipment.

5. The method of claim 4, wherein the subscription information is in a universal subscriber identity module (USIM) card of the user equipment.

6. The method of claim 1, wherein the determining includes:
    extracting the subscription information from one or more messages exchanged with at least one of the user equipment and a packet data network gateway.

7. The method of claim 6, wherein the message includes a user equipment (UE) REGISTER REQUEST message in a registration procedure and a non-access-stratum (NAS) REQUEST message in a NAS procedure.

8. The method of claim 1, wherein the determining includes:
    extracting an allowed CSG list from the subscription information of the user equipment;
    determining the user equipment as the CSG member when the allowed CSG list includes a CSG identity of the femtocell base station; and
    determining the user equipment as the non-CSG member when the allowed CSG list does not include the CSG identity of the femtocell base station.

9. The method of claim 1, wherein the allocating includes:
    requesting allocation of the private IP address by a packet data network gateway to the user equipment determined as the CSG member;
    receiving the requested private IP address from the packet data network gateway; and
    assigning the private IP address to the user equipment determined as the CSG member.

10. The method of claim 9, further comprising:
    receiving packets from the user equipment determined as the CSG member and forwarding the received packets to a private network associated with the private IP address; and
    receiving packets from the private network and forwarding the received packets to the user equipment determined as the CSG member.

11. The method of claim 1, wherein the allocating includes:
    requesting allocation of the public IP address by a packet data network gateway to the user equipment determined as the non-CSG member;
    receiving the requested public IP address from the packet data network gateway; and
    assigning the public IP address to the user equipment determined as the non-CSG member.

12. The method of claim 11, further comprising:
    receiving packets from the user equipment determined as the non-CSG member and forwarding the received packets to a public network associated with the public IP address; and
    receiving packets from the public network and forwarding the received packets to the user equipment determined as the non-CSG member.

13. The method of claim 1, comprising employing, by the femtocell base station, an access control mode.

14. The method of claim 1, comprising operating the femtocell base station in one of a CSG access mode and a hybrid mode.

15. A femtocell base station for providing different levels of service according to a subscription status of user equipment, the femtocell base station comprising:
    a determination unit configured to determine whether user equipment coupled to the femtocell base station is a closed subscriber group (CSG) member or a non-CSG member based on subscription information of the user equipment; and
    an IP request unit configured to allocate a private IP address to user equipment determined as the CSG-member and to allocate a public IP address to user equipment determined as the non-CSG member, wherein the private IP address is associated with an intranet service of the femtocell base station and the public IP address is associated with an internet service of the femtocell base station.

16. The femtocell base station of claim 15, further comprising a packet routing unit configured to:

route packets having the private IP address between the user equipment determined as the CSG member and an Intranet network associated with the private IP address; and route packets having the public IP address between the user equipment determined as the non-CSG member and an Internet network associated with the public IP address.

17. The femtocell base station of claim 15, wherein the determination unit is configured to:

collect the subscription information of the user equipment from at least one of a subscriber server and the user equipment;

extract an allowed CSG list from the subscription information of the user equipment;

determine the user equipment as the CSG member when the allowed CSG list includes a CSG identity of the femtocell base station; and determine the user equipment as the non-CSG member when the allowed CSG list does not include the CSG identity of the femtocell base station.

18. The femtocell base station of claim 15, wherein the IP request unit is configured to:

request a packet data network gateway to allocate the private IP address to the user equipment determined as the CSG member and to allocate the public IP address to the user equipment determined as the non-CSG member;

receive one of the private IP address and the public IP address from the packet data network gateway;

assign the user equipment determined as the CSG member with the private IP address; and assign the user equipment determined as the non-CSG member with the public IP address.

19. The femtocell base station of claim 15, wherein the femtocell base station operates in one of a CSG access mode and a hybrid mode.

\* \* \* \* \*